Oct. 27, 1953 W. E. ANTONY 2,657,313

DIRECTIONAL ANTENNA SYSTEM

Filed March 13, 1950 2 Sheets-Sheet 1

INVENTOR.
William E. Antony
BY
Mason, Fenwick & Lawrence
ATTORNEYS

INVENTOR.
William E. Antony
BY
Mason, Fenwick & Lawrence
ATTORNEYS

Patented Oct. 27, 1953 2,657,313

UNITED STATES PATENT OFFICE 2,657,313

DIRECTIONAL ANTENNA SYSTEM

William E. Antony, Shreveport, La.

Application March 13, 1950, Serial No. 149,353

2 Claims. (Cl. 250—33.57)

The present invention relates in general to antenna systems, and more particularly is directed to high frequency antennas designed for unidirectional, high gain, wide band performance, particularly for use in television and ultra-high frequency pulse communication systems.

Since the advent of radio, many attempts have been made to provide antennas capable of high gain performance of relatively uniform character over a wide band of frequencies. Initially when existing radio communication methods were restricted primarily to transmission of purely amplitude modulated carrier signals, the necessity for high quality reception over a broad frequency range was not so acute. This was because reception of any given amplitude modulated signal generally required constant gain characteristics over only a few thousand cycles frequency range, the side bands of the audio frequency modulated carrier extending only for a short distance along the frequency spectrum to either side of the carrier frequency.

The successful solution of this problem has become much more acute of late, however, due to the advent of commercial television and high frequency pulse communication. This is due to the fact that while the entire amplitude modulation broadcast band of frequencies extended over approximately only one megacycle, high fidelity television reception from only a single station requires an antenna system adapted to respond to signals extending over a spectrum width approximately six times that of the entire broadcast band.

The complexity of this problem becomes apparent from the fact that the video or picture signal of a single television channel extends through approximately five hundred times the frequency spectrum width of a signal in the broadcast band, and the frequency modulation signal, which supplies the sound to the television receiver, extends over approximately fifteen times the frequency range of the broadcast signal. Not only must a television antenna, to be successful from a commercial standpoint maintain substantially uniform gain characteristics over the range of one video signal, but must as a practical matter respond with an equally high degree of performance to a number of the twelve channels presently in use. Further, these twelve channels are not continuous in the radio frequency spectrum, as the first three channels occupy a frequency range of from 54 to 72 megacycles, the second two channels occupy a frequency range of from 76 to 88 megacycles, and the other seven channels function at a considerably higher frequency, occupying the range of from 174 megacycles to 216 megacycles. It is practically imperative, therefore, that antennas must maintain a high quality response over a frequency range of forty to fifty megacycles to be commercially successful.

With this extreme range of frequencies in mind, it will be apparent that the conventional methods of broad banding an antenna structure by merely reducing the Q of the circuit fail to provide a satisfactory solution to the problem. One conventional practice has been to provide a television receiver with a more or less conventional dipole that is deliberately mismatched to the transmission line. The effect of such a mismatched dipole is to provide very much more gain at resonance, but producing a greatly reduced degree of mismatch on either side of resonance, such that a fairly uniform response over the frequency range of one television channel is achieved.

Another complication is added by the fact that an optimum television antenna cannot have equally high gain response over the entire range from the lower frequency channel to the highest frequency channel, but rather, must to some degree, reject the signals in the standard frequency modulation band extending from 88 to 108 megacycles to prevent undue interference from signals in this band with the television signal.

An object of the present invention is the provision of an ultra-high frequency antenna system particularly adaptable to reception or transmission of television signals wherein a single antenna array readily fed from a conventional open wire transmission line may be employed for high gain performance throughout all of the present television channels.

Another object of the present invention is the provision of an ultra-high frequency antenna system particularly adapted for the transmission and reception of television signals, which is effective to discriminate against frequency modulation signals between the two lower groups of television channels and the upper group of television channels while maintaining substantially uniform high gain characteristics through the entire television band.

Another object of the present invention is the provision of an antenna system wherein a single antenna array is capable of achieving high gain performance through the entire television frequency band, while producing a high unidirectional pattern extending substantially unchanged between the full upper and lower limits of the present television frequency range. The provision of unidirectional characteristics in a television antenna is particularly important, as failure to provide unidirectional characteristics will result in an antenna disposed to pick up signals other than those emanating directly from the transmitting station, such as signals reflecting from buildings, aircraft and other highly reflective objects, which reflected signals will be improperly phased relative to the directly received signals and give rise to multiple images, ghosts and other image distortions in the television receiver.

Another object of the present invention is the provision of an ultra-high frequency antenna particularly adapted to the transmission and reception of television signals, which is characterized by uniform high gain reception characterisitcs over a wide band of frequencies and which is highly responsive to both horizontally and vertically polarized signals.

Another object of the present invention is the provision of an ultra-high frequency antenna particularly adapted to the transmission and reception of television signals which provides uniform high gain reception over the entire television frequency range, and which is readily adaptable to be rendered predominantly responsive to either horizontally or vertically polarized signals.

Another object of the present invention is the provision of an ultra high frequency antenna particularly adapted for the transmission and reception of television signals, which possesses uniform high gain characteristics over a wide band of frequencies, and which is composed of individual basic antenna units adapted to be readily stacked in coplanar vertically or laterally associated groups and to be rendered predominantly responsive to either horizontally or vertically polarized signals.

Another object of the present invention is the provision of an ultra-high frequency antenna system particularly adapted for reception of television signals which possesses uniform high gain response characteristics over a wide band of frequencies, and which is possessed of input impedance characteristics substantially matched to a conventional 300 ohms twin lead transmission line to obviate the necessity of quarter wave sections or other matching devices at the input to the antenna.

Another object of the present invention is the provision of an ultra-high frequency antenna system particularly adapted to the reception of television signals having high gain response characteristics over a broad range of frequencies, and which is of a physical construction rendering it readily adaptable to be mounted on a single rotatable mast and designed to be commercially manufactured at a reasonable cost, which is of relatively low weight so that it may be mounted without significant reenforcement, and which is of highly durable construction adapted to withstand severe wear precipitated by weather and the elements.

Other objects and capabilities of the present invention will become apparent from the following detail description taken in conjunction with the accompanying drawings, in which only a preferred embodiment of the invention is illustrated.

The invention in general is particularly designed to operate through the higher frequency television band including the seven channels from 174 megacycles to 216 megacycles because of the reduced physical dimensions required for radiation elements designed to operate over these frequencies. To this end the antenna is comprised, generally, of an array composed of a plurality of accurately spaced basic antenna units, each comprising a single turn open circuited circular loop disposed in a vertical plane and driven through a suitable open wire transmission line, and an associated single turn circular loop which is short-circuited and spaced uniformly behind the driven loop in a plane parallel to that of the driven loop. The parasitic loop is dimensioned approximately eleven percent larger in circumference than the driven element in order to operate as a parasitic reflector, and is spaced 0.15 wave length behind the driven element to achieve optimum directional and reradiation efficiency. The driven element of each of the basic antenna units is driven in "in phase" relation to each of the other driven elements, and may be stacked horizontally and vertically to provide extremely high gain over a large number of adjacent television channels. The driven elements are formed of one wave length circumference for the mean frequency of the band over which the antenna is designed to be receptive.

Figures 1, 2, 3:
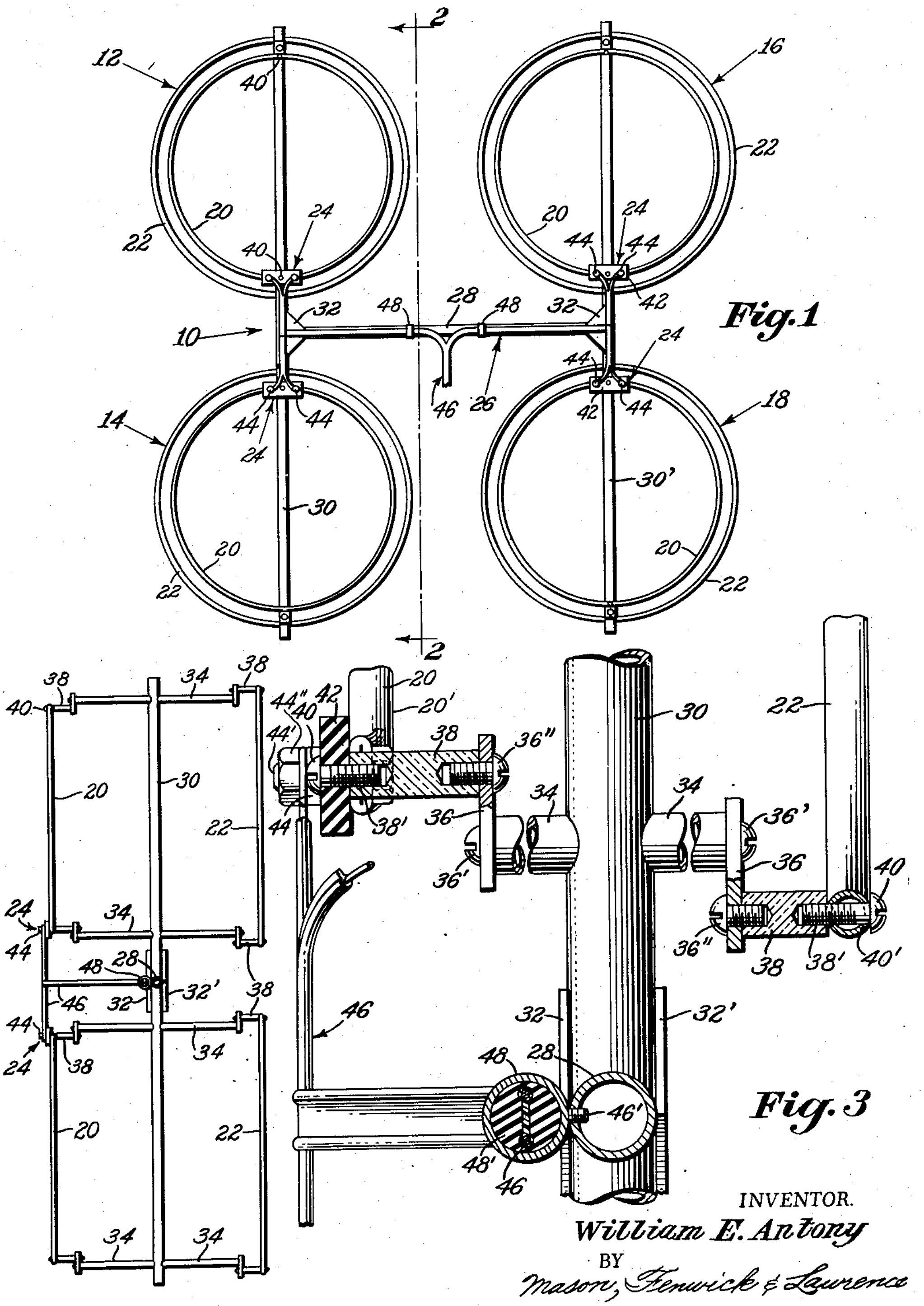
Figure 1 is a front elevational view of the preferred commercial embodiment of the present invention.
Figure 2 is a side view of one pair of the basic reception units forming half of the antenna array in the preferred embodiment of the instant antenna system.
Figure 3 is a fragmentary view of the preferred embodiment of the present invention, shown partially in section and partially in elevation, illustrating the manner of coupling the driven loops and parasitic reflector elements to the antenna array supporting frame, and showing the manner in which the twin transmission line leads are coupled to the driven antenna elements.

The invention will be more fully understood from the following detail description taken in conjunction with the accompanying drawings, wherein like reference characters designate corresponding elements throughout the several figures. Referring particularly to Figures 1 to 3, the instant antenna, in its preferred commercial form, comprises a stacked antenna array, generally indicated at 10, consisting of four spaced basic antenna units, designated 12, 14, 16 and 18. The basic antenna units are precisely identical in physical construction, and a detail description of one of the basic units will suffice for all.

Each of the basic antenna units, such as the unit designated 12, comprises a single turn circular loop 20, disposed in a vertical plane and operating as the driven element of the basic unit 12. Spaced behind the driven element 20, as viewed in Figure 1, is a similar single turn circular loop 22 disposed in a plane parallel to that of the driven element 20, and operating as a parasitic reflector for the driven element 20 by virtue of its being constructed with an eleven percent larger circumference than that of the driven element 20. It has been determined by empirical tests that spacing of the parasitic reflector element 22 a distance equal to 0.15 wave length behind the driven element 20 yields optimum directivity and gain characteristics. The driven element 20 is formed of a tubular shaped metallic conductor, more clearly illustrated at 20′ in Figure 3, and is open circuited at one point 24 along the circumference thereof, hereinafter termed the feed point, to be coupled to a suitable transmission line for coupling the radiation energy into and from the driven loop 20.

In order to support the plurality of basic antenna units forming the array 10, a frame, generally indicated at 26, preferably constructed of rigid tubular members, is provided, comprising a cross piece 28, and vertically disposed mutually parallel struts 30, 30′ constructed of the same material. The vertically disposed struts 30 and 30′ are suitably secured to the opposed ends of the horizontally disposed cross piece 28, and are rigidly braced relative thereto by angular reenforcing brackets 32, 32′. Any suitable means may be provided at the center of the cross piece 28 to secure the cross piece to a suitable antenna turnstile, rotatable mast, or other support.

Means are provided on the vertically disposed struts 30, 30′ to support the driven and parasitic loops 20 and 22 at spaced diametrically opposed points along the circumference of the elements 20 and 22, comprising outstanding tubular studs 34, welded or otherwise suitably secured to the vertical struts 30, 30′. The tubular studs 34 extend forwardly and rearwardly from the struts 30, 30′ concentric with an axis intersecting the longitudinal medial axis of the struts 30, 30′, and are provided with internally threaded recesses at the outer ends thereof by which coupling plates or links 36 are secured to the studs 34 through suitable screws 36′.

Suitable spacers or insulators 38, constructed of polystyrene, phenolic plastic or ceramic material, or the like, are coupled to the plates 36 on axes offset from the medial axis of the studs 34 by means of screws 36″ extending through the plate 36 and received by complementary threaded internal recesses in the ends of insulators 38.

The outer ends of the insulators 38 are likewise provided with threaded recesses 38′ adapted to receive the threaded shank of suitable screws 40 extending through complementary apertures 40′ in the loops 20, 22 for rigidly supporting the driven and parasitic elements. This coupling is employed at all points on the driven elements 20 and parasitic elements 22, except at the feed points 24 of the driven elements 20.

The coupling of the driven elements 20 to the insulators 38 at the feed point 24 of the driven elements is accomplished in a somewhat different manner, however, the insulators 38 at these points being somewhat more elongated than those employed for mounting the elements at other than the feed points. The insulators 38 located at the feed points of the driven elements extend into the spaces between the open ends of the driven element terminating to either side of the insulator 38. By means of screws 40, a terminal plate 42 of insulating material is coupled to the insulator 38, at approximately its center and is provided with spaced electrical terminals 44 disposed to either side of the central coupling screw 40, comprising screws 44′ extending through suitable apertures in the ends of the driven element 20 adjacent the feed point 24, threaded shanks of the screws 44′ extending forwardly of the terminal plate 42. Suitable bolts 44″ are threaded into the exposed ends of the screws 44′ for clamping conduction leads of a conventional 300 ohm transmission line generally indicated at 46.

The transmission line 46 for convenience is guided along the cross piece 28 and struts 30, 30′ of the frame 26, and to this end is provided at spaced points with a mounting element comprising a ring 48 having a fill 48′ of suitable insulating plastic material in which the twin lead transmission line 46 is embedded. This ring is secured to the tubular elements of the frame 26 by means of threaded screws 46′ extending into complementary threaded apertures in the periphery of the frame.

A more complete understanding of the operation of the invention will be had by reference to Figures 4 through 11, illustrating various species of the invention employing different arrangements and groupings of the basic antenna units. It is to be understood that the present invention is not limited to the preferred embodiment above described, employing a vertically and horizontally stacked array of the basic antenna units, but may constitute diverse combinations and arrangement of these groups in a manner to be hereinafter described.

Figure 4:
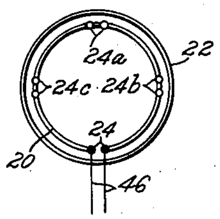
Figure 4 is a front elevational schematic view of an antenna in accordance with the present invention utilizing a single basic antenna unit.
Figure 5:
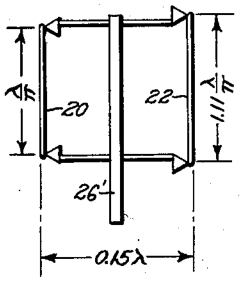
Figure 5 is a side elevational schematic view of the single basic antenna unit illustrated in Figure 4.

Referring particularly to Figures 4 and 5, a suitable antenna for reception of high frequency radiation in the television bands can be constructed of but one of such basic antenna units, such as any one of the units 12, 14, 16 and 18 illustrated in Figures 1 to 3. As illustrated in Figures 4 and 5, a suitable antenna may be constructed of a single turn vertical loop 20 formed of tubular metallic conductive material, provided with open ends to form an open circuit loop having feed points at any one of the points 24, 24*a*, 24*b*, 24*c*. This single turn loop 20 is adapted to be employed as the driven element, the radiation energy being fed to the driven element 20 by means of a conventional 300 ohm twin lead transmission line 46 coupled at the feed point 24 of the driven loop. The loop 20 is formed of a circumference equal to one wave length at the mean frequency of the band over which the antenna is designed to be responsive, and has been found to have extremely desirable high gain and broad band reception characteristics. Spaced 0.15 wave lengths behind the driven element 20 is a similar single turn vertical loop 22 disposed in a plane parallel to that of the driven element 20, and likewise formed of tubular metallic conductive material. The loop 22 is continuous throughout its entire circumference, thus forming a closed loop, and is provided with a circumference eleven per cent larger than that of the loop 20, or 1.11 wave length. The diameter of the ring 22 is 0.353 wave length for the mean frequency.

The loop 22 being slightly larger than the driven element 20, appears to the loop 20 as an electrical radiation reflector, and operates to provide unidirectional reception characteristics for the antenna unit with its principal directive axis disposed perpendicular to the plane of the loops 20 and 22, and disposed forwardly of the driven element 20, and likewise expands frequency response of the unit to a wide band of frequencies. Both loops 20 and 22 may be mounted on suitable supports such as the frame generally indicated at 26′, and are supported relative to the frame by means of suitable studs and insulators such as those described in detail in connection with Figures 1 and 3.

The transmission line, generally indicated at 46, to the television receiver or transmitter can be connected to either points 24 or 24*a* at the bottom and top of the driven loop respectively, to provide predominant horizontal polarization transmission or reception characteristics, or may be coupled to the side feed points 24*b* and 24*c* on the driven element 20 to provide predominantly vertical polarization transmission or reception characteristics. Connection of the transmission line 46 at a suitable point on the driven element 20 approximately equal distance between points 24—24*a* and 24*b*—24*c* will result in equal horizontal and vertical polarization response or transmission. The impedance at any of the feed points 24—24*c* on the driven ring is approximately 150 ohms, which is predominantly resistance when the driven ring is dimensioned to a circumference of one wave length, and is used in conjunction with the single turn vertical closed loop 22 of 1.11 wave length spaced 0.15 behind the driven element 20.

The radiation from or response to incoming signals by the driven element 20 alone is elongated or bi-directional, being maximum at right angles to the plane of the loop. The radiation and response are minimum along the plane of the loop. This is by reason of the fact that an incoming signal at right angles to the plane of the loop 20 induces an equal voltage in each side of the loop 20 which is "in phase," the effect of the two voltages being additive. A signal arriving in alignment with the plane of the loop 20 induces a voltage in one side of the loop nearest the signal and 0.318 wave length later induces a voltage in the other side of the loop 20. The phase relation of the two voltages is sufficiently out of phase to afford substantial cancellation.

The placing of the single turn vertical closed loop 22 0.15 wave length behind the driven loop causes the radiation or response of the driven loop to become essentially unidirectional, as the spacing and larger size of the reflector loop 22 combine to cause the voltage induced in the two loops to be out of phase for signals arriving from the direction of the reflector and in phase for signals arriving from the direction of the driven loop 20. Since the reflector element 22 is of the same type element as the driven element 20, the radiation and response characteristics of the reflector element 22 is in all respects similar to those of the driven loop 20, the combination of the two elements resulting in broad band characteristics and dual response to vertical as well as horizontal polarization being maintained, while high gain and unidirectional properties are likewise achieved.

Figure 6:
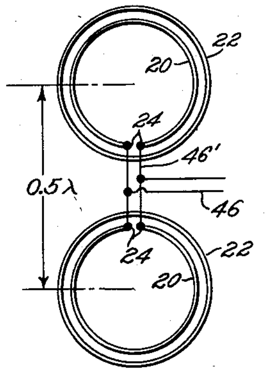
Figure 6 is a front elevational schematic view of an antenna array formed of two of the basic antenna units embodying the present invention.
Figure 7:
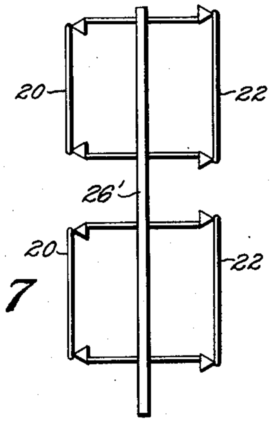
Figure 7 is a side elevational schematic view of the antenna array illustrated in Figure 6.

Figures 6 and 7 illustrate an array consisting of a pair of the basic antenna units comprising driven elements 20 and parasitic element 22, arranged in vertically stacked relation. In this form, the centers of the driven loops 20 are spaced 0.5 wave length apart vertically, and the feed points 24 of the two driven loops 20 are connected together for "in phase" operation by a section of 300 ohm transmission line designated 46′, which is likewise 0.5 wave length long electrically. The transmission line 46 to the receiver or transmitter is connected at the mid-point of the section 46′ connecting the driven loops, resulting in a load of 300 ohms for the transmission line 46.

Figure 8:
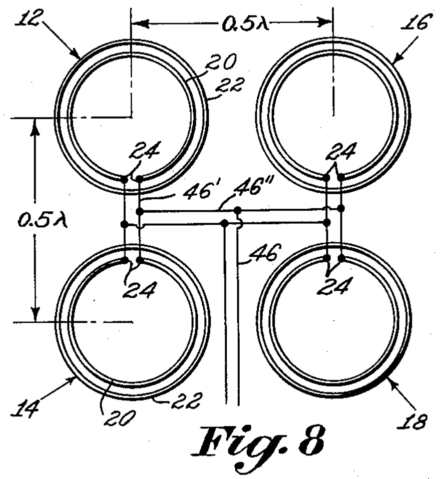
Figure 8 is a front elevational schematic view of an antenna array employing four of the basic antenna units embodying the present invention.

Figure 8 illustrates in schematic form the embodiment described in detail in connection with Figures 1 to 3, comprising four of the basic antenna units arranged in both vertically and horizontally stacked fashion. The units 12, 14, 16 and 18 comprising the array, each consisting of a one wave length circumference driven element 20 and a 1.11 wave length closed loop parasitic reflector 22, are arranged with the centers of the driven loops 20 spaced 0.50 wave lengths apart both horizontally and vertically. The connection between the feed points 24 of the driven loops 20 is such as to provide "in phase" operation for all driven rings, and at the same time provide an acceptable impedence match for a 300 ohm transmission line 46. This as described in connection with Figures 6 and 7 is provided by employing 0.5 wave length 300 ohm transmission line sections between the feed points 24 of units 12 and 14, and between units 16 and 18, and intercoupling the mid-points of these sections 46′ by a similar 300 ohm transmission line section 46″ of 0.5 wave length electrically, to the mid-point of which latter section 46″ the 300 ohm transmission line 46 to the receiver or transmitter is coupled. The arrangement illustrated in Figure 8 has been placed under actual test, and has resulted in a measured forward gain of 16 decibels or a power gain of 40, which was maintained substantially uniformly over a broad band of frequency extending through several adjacent television channels.

Figure 9:
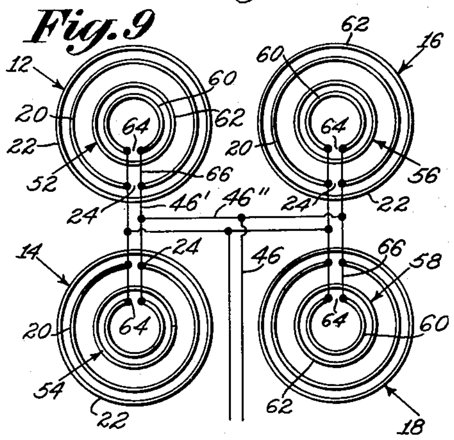
Figure 9 is a front elevational schematic view of an antenna array constituting a further modification of the present invention.
Figure 10:
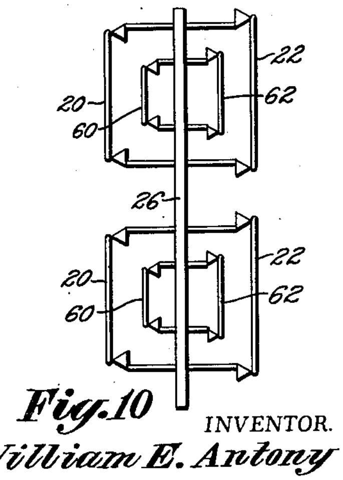
Figure 10 is a side elevational schematic view with modification of the present invention illustrated in Figure 9.

A still further modification is illustrated in Figures 9 and 10, which employs in addition to the array illustrated in Figures 1 to 3 and 8 comprising the four basic units each made up of the driven element 20 and the reflector 22, an additional group of four basic units dimensioned for a higher frequency. The smaller units, indicated generally at 52, 54, 56 and 58, are disposed coaxially within the larger units 12, 14, 16 and 18, respectively, and are each composed of an open circuited single turn vertical loop 60 of one wave length circumference for the mean frequency for which the units 52 to 58 inclusive, are designed to be responsive, and likewise include a rearwardly spaced parasitic reflector comprising a single turn closed loop 62 of eleven percent greater circumference than the loop 60. The loop 62, as in the case of the larger loop 22, is spaced 0.15 wave length rearwardly of its associated driven loop 60, and is provided with feed point 64 to be coupled through a 300 ohm transmission line sections 66 to the transmission line terminals of the feed points 24 of the loops 20. The vertical and horizontal spacing between the centers of the larger driven loops 20 is 0.50 wave length, and the spacing between the smaller driven loops 60, which are simply placed within the larger loops, horizontally and vertically, in coaxial alignment therewith, is in excess of 0.50 wave length at the mean frequency for which the smaller loops 60 are dimensioned. The various driven loops 20 and 60 are coupled together as illustrated in Figure 4 with sections 66 of 300 ohm transmission line, the electrical dimensions of the interconnecting lines being such as to provide a negligible loading effect from the higher frequency units 52, 54, 56 and 58 on the lower frequency units 12, 14, 16 and 18 while receiving or transmitting at the lower frequency, and at the same time maintaining "in phase" operation for all driven elements 20 and a reasonable match for the 300 ohm transmission line at both the high and low frequencies. The driven and parasitic loops of both groups of units 12 to 18 and 52 to 58 are all suitably supported from the frame 26 with intermediate insulators as described in detail in connection with Figures 1 to 3. This combination of high and low frequency basic units provides an antenna that is essentially unidirectional and possesses high forward gain at both the high and low frequencies for which it is dimensioned. Obviously, the units 12—18 and 52—58 may be dimensioned for the low frequency television channels at 54 to 88 megacycles, and the high frequency television channels at 174–216 megacycles, respectively, thus providing an antenna array of high efficiency operable over the entire 12 channel range.

Figure 11:
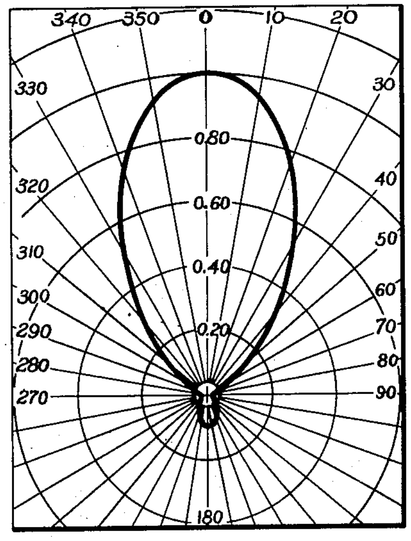
Figure 11 is a polar coordinate plot of electric field strength of the antenna array illustrated in Figure 8, indicating the theoretical field strength at a fixed distance from the center of the array plotted against azimuthal angle from the principal directional axis of the array, and indicating the unidirectional reception characteristics of the array.

Figure 11 is a polar coordinating plot of the electric field strength of the antenna array illustrated in Figures 1 to 3 and 8, indicating the theoretical field strength of the array at a fixed distance from the center of the array plotted against angular bearing from the principal directional axis of the array. It is clear from the plot of Figure 11 that the species of the invention illustrated in Figures 1 to 3 and 8 of the drawing is possessed of high unidirectional characteristics which are extremely desirable in connection with television antennas to reduce ghost images and distortion from reflected out of phase signals.

Experiments with the antenna system above described indicate that aside from being highly efficient from an electrical standpoint, the antenna is highly satisfactory by reason of its mechanical design. It is readily apparent that the structure is relatively compact and may be constructed out of readily available materials, and that the unit may be conveniently mounted in any suitable location and easily oriented so that its unidirectional pattern lies in any direction desired. The structure is inherently strong and rugged so that the antenna is not only capable of bearing up under normal weather conditions but will effectively withstand the strains due to high winds or excessive ice loading. Nevertheless the antenna is readily capable of economic manufacture and may be conveniently assembled and maintained. It is apparent, therefore, that the instant device is well suited to commercial sale and may be installed in any typical installation with ease.

Various modifications may be made in the invention without departing from the spirit and scope thereof, and it is desired, therefore, that only such limitations shall be placed thereon as are imposed by the prior art and are set forth in the appended claims.

What is claimed is:

1. A unidirectional antenna system having substantially constant resistance and gain characteristics over a broad operating band of ultra-high frequencies including, an array of a plurality of groups of antenna sections, each of said sections comprising a conducting ring disposed in a vertical plane and having an open circuited feed point along the circumference thereof and an interrupted conducting ring spaced therefrom having a physical circumference slightly greater than that of the open-circuited ring to form a parasitic reflector, a group of said antenna sections being disposed in substantially vertical coplanar relation, the open-circuited first rings of said group being resonant at the mean frequency of a low frequency band, and a second group of said antenna sections having open-circuited rings resonant at the mean frequency of a higher frequency band, the rings of said second group of antenna sections being disposed coaxially within the rings of said first group of antenna sections, radio frequency transmission line means coupled in parallel circuit relation from a common point to the feed point of said open-circuited rings of said first mentioned group of antenna sections, each branch of the parallel transmission line means being of an electrical length to couple energy to each of the feed points in an inphase relation, and transmission line sections coupled between the feed points of the open-circuited rings of adjacent open-circuited rings in said first and second groups of an electrical length to effectively isolate the associated higher and lower frequency rings and provide negligible loading effect on either due to the other.

2. A unidirectional antenna system having substantially constant resistance and gain characteristics over a broad operating band of ultra-high frequencies including, an array of a plurality of groups of antenna sections, each of said sections comprising a conducting ring disposed in a vertical plane and having an open-circuited feed point along the circumference thereof and an uninterrupted conducting ring spaced therefrom having a physical circumference slightly greater than that of the first ring to form a parasitic reflector, a group of said antenna sections being disposed in substantially vertical coplanar relation, the open-circuited rings of said group having a circumference of one wave length at the mean frequency of a lower frequency band, with the axes of the rings spaced substantially one-half wave length apart vertically and horizontally, and a second group of said antenna sections having open-circuited rings of a circumference corresponding to one wave length at the mean frequency of a higher frequency band, the rings of said second group of antenna sections being disposed coaxially within the rings of said first group of antenna sections, radio frequency transmission line means coupled in parallel circuit relation from a common point to the feed point of said open-circuited rings of said first mentioned group of antenna sections, each branch of the parallel transmission line means being of an electrical length to couple energy to each of the feed points in an inphase relation, and transmission line sections coupled between the feed points of the open-circuited rings of adjacent open-circuited rings in said first and second groups of an electrical length to effectively isolate the associated higher and lower frequency rings and provide negligible loading effect on either due to the other.

WILLIAM E. ANTONY.

References Cited in the file of this patent

UNITED STATES PATENTS

| Number | Name | Date |
|---|---|---|
| 2,270,130 | Laport | Aug. 30, 1940 |
| 2,295,302 | Spoon | Sept. 8, 1942 |
| 2,422,076 | Brown | June 10, 1947 |
| 2,511,574 | Finneburgh, Jr., et al. | June 13, 1950 |

OTHER REFERENCES

CQ, December 1948, pp. 37 and 38.